Oct. 15, 1968 J. J. WELLER ET AL 3,405,799

SHOCK MOUNT FOR SHIPPING TELEVISION TUBES

Filed May 29, 1967 3 Sheets-Sheet 1

INVENTORS
JOHN J. WELLER
RONALD A. WEAVER
BY
Hopgood & Calimafde
ATTORNEYS

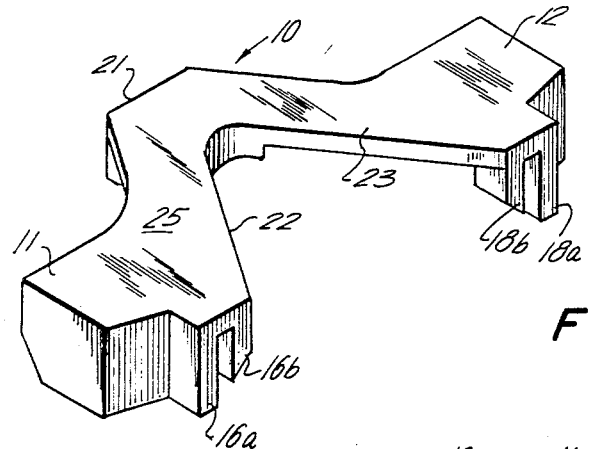
FIG.5
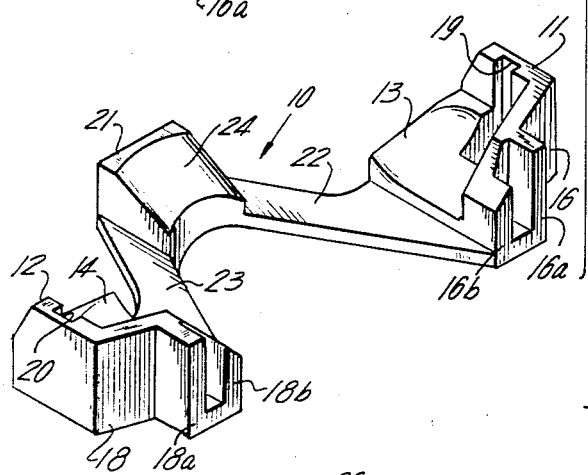
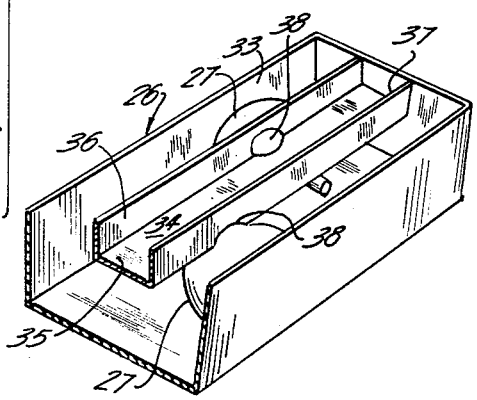
FIG.9
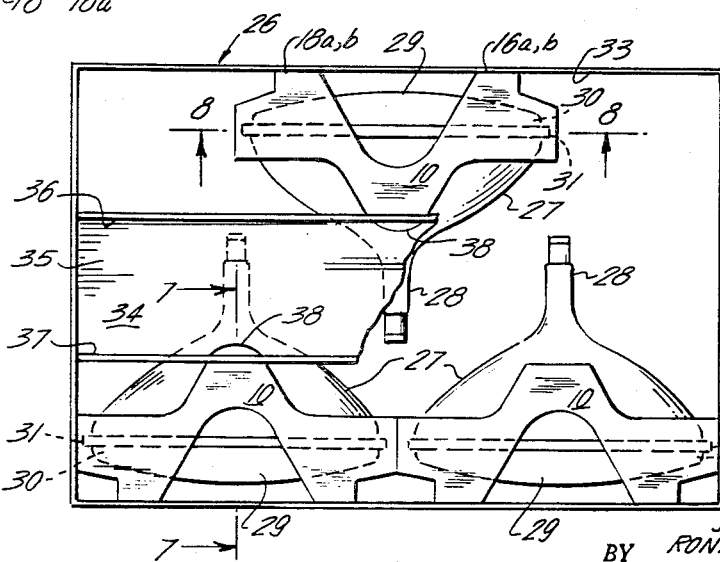
FIG.6
INVENTORS
JOHN J. WELLER
RONALD A. WEAVER
BY
Hopgood & Calimafde
ATTORNEYS Oct. 15, 1968     J. J. WELLER ET AL     3,405,799
SHOCK MOUNT FOR SHIPPING TELEVISION TUBES
Filed May 29, 1967     3 Sheets-Sheet 3
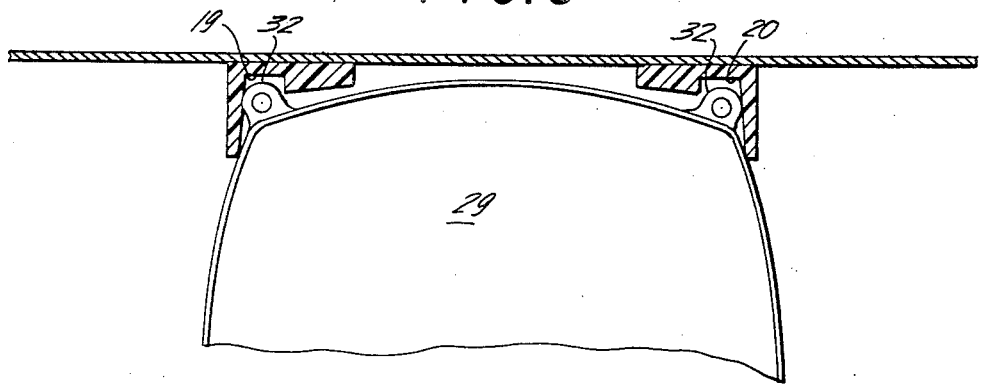
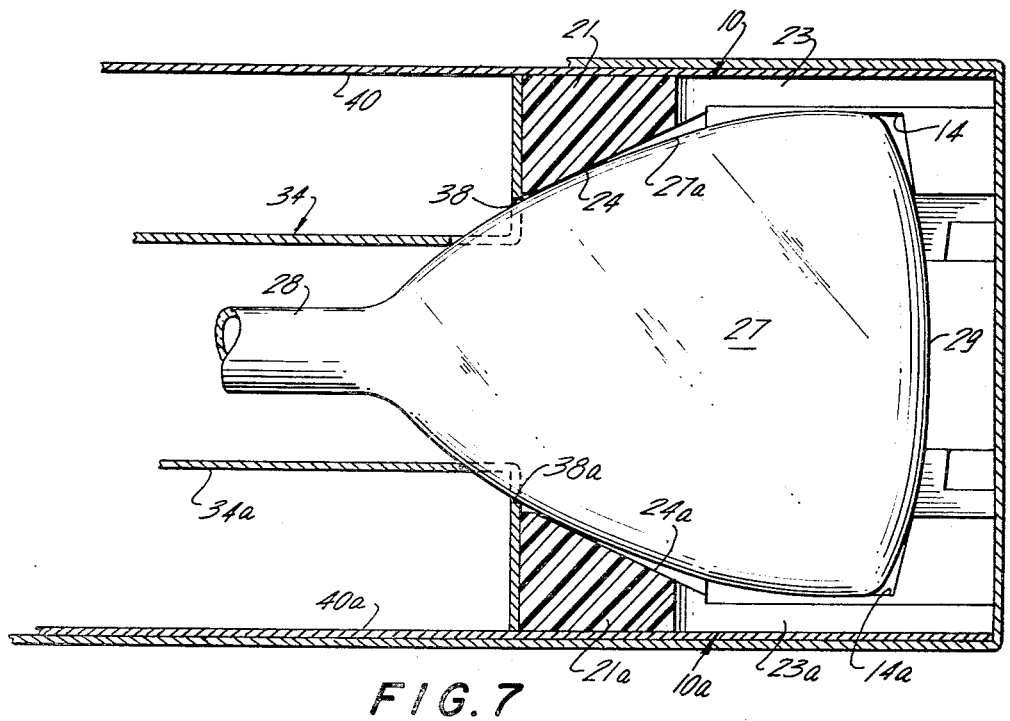
INVENTORS.
JOHN J. WELLER
RONALD A. WEAVER
BY
ATTORNEYS

United States Patent Office 3,405,799
Patented Oct. 15, 1968

3,405,799
SHOCK MOUNT FOR SHIPPING
TELEVISION TUBES
John J. Weller, Emmaus, and Ronald A. Weaver, Macungie, Pa., assignors to Cryo-Therm, Inc., Fogelsville, Pa., a corporation of Delaware
Filed May 29, 1967, Ser. No. 641,996
18 Claims. (Cl. 206—65)

ABSTRACT OF THE DISCLOSURE

A shock mount for shipping glass envelopes of conoidal shape, e.g. television tubes, is disclosed. The mount may have the shape of a yoke of shock-resistant material, e.g. expanded plastic, the yoke having a pair of wings joined to a centrally offset foot section. Each of the wings has a pocket for receiving in shock-mounting relationship a portion of the peripheral edge of the envelope, the foot having an envelope-contacting face shaped to bear against a conical portion of the envelope. The glass envelope is supported in shipment by a pair of the yokes located diametrically opposite each other so that peripheral edge portions of the glass envelope are confined within the wing pockets and so that the foot section of each yoke rests against a tapered portion of the envelope.

---

This invention relates to a shock-mount for use in shipping glass envelopes, such as television tubes, and to a shock-resistant mounting assembly in which a television tube is supported for shipping by a pair of yokes of shock-resistant material.

Large glass envelopes having a conoidal shape, for example a shape like a cone or a tapered shape roughly approximately a cone, must be handled carefully during shipment. This is particularly true of television tubes. Generally speaking, television tubes are shipped either with the large end face down or up. However, color television tubes shipped in this fashion present some problems. Since television tubes may contain small loose particles as a result of manufacture, these particles may enter the holes of the mask when the tubes are shipped face down and thus interfere with the operation of the mask when the tubes are assembled in sets. Where the tubes are shipped face up, these particles may lodge themselves in the gun and thus adversely affect its operation.

It would be desirable to provide a simply constructed shock mount to enable shipping television tubes with the axis thereof supported substantially horizontally so as to minimize movement of extraneous particles longitudinally of the tube and thereby avoid enlodgement in critical parts of the tube.

It is the object of this invention to provide a shock mount cushion for shipping glass envelopes of substantially conoidal shape.

Another object is to provide a shock mount of shock-resistant material, such as expanded plastic, for shipping television tubes in substantially the horizontal position.

A further object is to provide a shock mount for shipping television tubes, the shock mount being in the form of a yoke, a pair of yokes being employed between which a television tube may be horizontally supported for shipment.

A still further object is to provide a shipping package comprising in combination a container having confined therein at least one television tube supported in substantially the horizontal position between a pair of shock mounts, each having the shape of a yoke, the yokes being substantially diametrically opposite each other.

These and other objects will more clearly appear from the following description and the accompanying drawing, wherein:

FIGS. 1 and 2 are illustrative of one embodiment of a shock mount provided by the invention;

FIGS. 3 and 4 are cross-sections taken along line 3—3 of FIG. 2 and line 4—4 of FIGS. 1 and 2, respectively;

FIG. 5 shows an exploded view in three dimensions of two shock mount elements in opposed relationship;

FIG. 6 is illustrative of one means of stagger-packing a plurality of television tubes in a container for shipment using the shock mount of the invention;

FIG. 7 is a section taken along line 7—7 of FIG. 6;

FIG. 8 is a section taken along line 8—8 of FIG. 6; and

FIG. 9 depicts a portion of a container showing an arrangement of two television tubes without the shock mounts in order to clearly show their position in the container.

In its broad aspects, the invention is directed to a shock mount cushion for a glass envelope having a conoidal body portion with an end face at its enlarged portion having a continuous peripheral edge which comprises a yoke of shock-resistant material, the yoke being characterized by a pair of transversely spaced wings joined to a centrally offset foot, each of the spaced wings having a pocket for receiving in shock-mounting relationship a portion of the peripheral edge of the envelope, the foot having an envelope-contacting face shaped to bear in shock-mounting relationship against a conical or tapered portion of the conoidal envelope.

The shipping assembly comprises a glass envelope having the aforementioned shape with its axis disposed substantially horizontally and a pair of yokes of molded expanded plastic contacting opposite diametral portions of the envelope. Each of the yokes has a planar face on one side locating the yokes in a container, such as a rectangularly shaped container.

Figure 1:
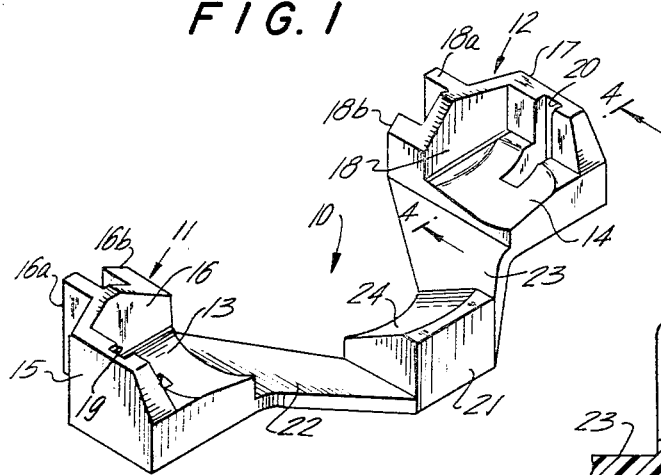

One embodiment of a shock mount element provided by the invention is shown as a yoke 10 in FIG. 1 comprising a pair of transversely spaced wings 11, 12 having corner pockets 13, 14 bounded by walls 15, 16 and 17, 18, respectively. Wall 16 of pocket 13 has a pair of extending ribs 16a, 16b for reinforcing the wall, wall 18 of pocket 14 being similarly provided with ribs 18a, 18b. Each of the pockets is provided with a slotted recess 19 and 20, respectively, for purpose of providing clearance for ears extending from mounting brackets normally employed on television tubes (note FIG. 8).

Figure 2:
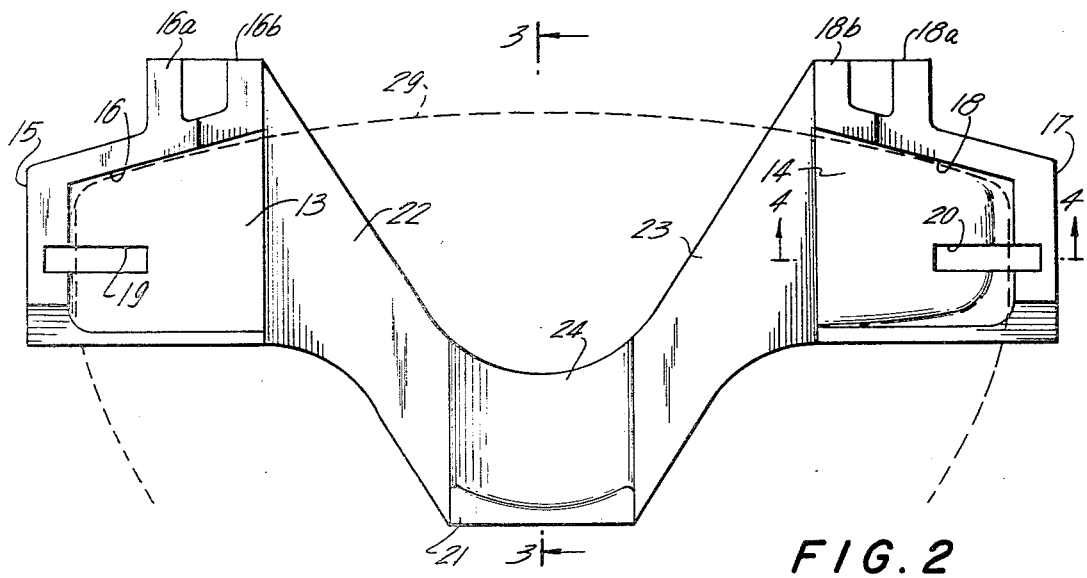

The two wings are coupled to a centrally offset foot 21 via webs 22, 23, the foot projecting from the plane of the webs and having an inclined bearing face 24 adapted to bear against a conical portion of the glass envelope. The webs preferably lie in the same plane and are extensions of the bottom outside surface of the wings (note FIG. 5). FIG. 2 is a top view of FIG. 1, the same parts having the same numerals. There a front portion 29 of a television tube is shown in dotted line to illustrate how the peripheral portion of the tube rests in the pockets.

Figure 4:
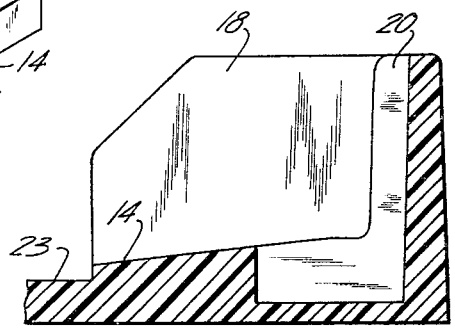
Figure 3:
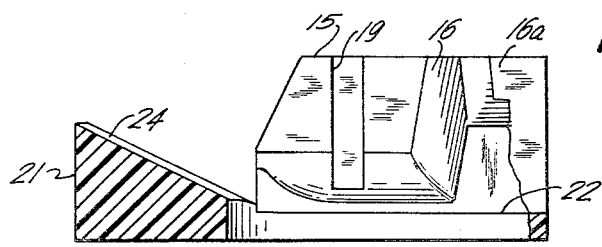

FIGS. 3 and 4 which are cross sections taken along lines 3—3 and 4—4, respectively, of FIG. 3 show the contouring of the pockets and the taper of foot section 21 as depicted by slope 24. The width of the pockets in the wings is such as to receive a peripheral portion of the end face of a television tube (note FIG. 6).

Referring to FIG. 5, a pair of yokes 10 is shown in exploded arrangement, it being understood that a television tube (not shown) would be horizontally supported between the two yokes (note FIG. 7). One face 25 of the yoke is substantially planar which enables the yoke to be easily supported within a carton such as shown in FIG. 6. Webs 22, 23 lie in the same plane with surface 25.

In FIG. 6, three shock-mounting assemblies are shown in top view in carton 26 in which three television tubes 27 are supported substantially horizontally and staggered to provide two tubes on one side of the box and one on the other but with the tube neck 28 extending between the first tubes. As will be noted, the main body of the tubes is substantially conoidal in shape, the end face 29 being at the enlarged portion of the tube, a portion of the peripheral edge 30 near the face of the tube resting in the wing pockets as shown. In this instance, each of the tubes is shown with a bracket 31 having four projecting ears 33 two of which are shown projecting into slots 19, 20 in FIG. 8, which is a view taken along line 8—8 of FIG. 6.

The yokes are designed so as to enable them to be easily indexed in the box. The side with the planar face can be set down in the bottom of the box and, if desired, can be attached to the bottom by an adhesive. The reinforced end faces of the wings, 16a, b and 18a, b (FIG. 6) are adapted to hit flush up against side 33 of carton 26 and, if desired, may be glued to the side of the box.

Shown in partial section (FIG. 6) is a locator 34 in the shape of a channel, the locator having a bottom 35 and side walls 36, 37. The locator, when used, is generally made of reinforced or corrugated cardboard and is provided with cutouts 38 to enable the locator to index itself relative to the tubes in the box, the curved portions of the tube entering the cutouts. A similar locator may be employed at the bottom of the box. In FIG. 9, the relationship of locator 34 to carton 26 and tubes 27 is shown, the shock mounts being omitted in order to show the relationship more clearly.

Referring to FIG. 7, a partial section in elevation is depicted taken along line 7—7 of FIG. 6 and showing the tube 27 having a conoidal body portion 27a, an end face 29 at its wide portion and a neck 28 extending coaxially from substantially the vertex of the conoidal portion. The tube is shown supported in shock-mounting relationship between a pair of yokes 10, 10a, the peripheral edge portion of the tube resting in pockets 14, 14a of the wings. Foot 21 of yoke 10 and 21a of yoke 10a have inclined bearing surfaces 24, 24a, respectively, which bear against the conoidal portion of the tube to provide shock mounting support. Locators 34, 34a are shown indexed in position via cutouts 38, 38a. The locators, when used, are advantageous in preventing movement of the assembled tubes along their axial direction.

Shock mount elements 10 are made in a single cavity mold using expansible polystyrene beads. The shapes can also be made from foam plastic. The term expanded plastic is meant to include any method of producing low density plastic moldings. Densities of such molded plastic may range from 1 to 40 lbs. per cubic foot and, more desirably, from about 1 to 6 lbs. per cubic foot. Of course, any type of shock-resistant material can be used, including the general class of elastomeric materials, (e.g. natural or synthetic rubber, plastics, and the like), certain known composition materials and the like. We find it advantageous for our purposes, however, to produce our shock mounts from expanded polystyrene. The yoke produced from such materials has a springy, yieldable characteristic and can absorb stresses normally injurious to glass and other brittle articles.

By producing the shock mount elements with a planar face, the elements can be glued and prepositioned on a flat piece of corrugated cardboard which can then be easily indexed in position in the carton or box. In FIG. 7, two flat pieces of cardboard 40, 40a are shown within the carton to which yokes or elements 10, 10a are glued on the flat face side, that is at planar face 25 shown in FIG. 5.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invetnion and the appended claims.

We claim:

1. A shock mount cushion for supporting horizontally a glass envelope having a conoidal body portion with an end face at its enlarged portion having a continuous peripheral edge which comprises,
   a yoke of shock-resistant material,
   said yoke being characterized by a pair of transversely spaced wings joined to a centrally offset foot,
   each of said spaced wings having a pocket for receiving in shock-mounting relationship a portion of the peripheral edge of said envelope,
   said foot having an inclined envelope-contacting face for bearing in shock-mounting relationship against a tapered portion of said conoidal envelope.

2. The shock-mount cushion of claim 1, wherein the shock resistant material is expanded plastic.

3. The shock-mount cushion of claim 2, wherein the expanded plastic is polystyrene.

4. The shock-mount cushion of claim 2, wherein each pocket of the wings is bounded by two walls.

5. The shock-mount cushion of claim 4, wherein at least one of said walls of each pocket has integral with it a ribbed structure whereby to provide stiffness to said wall.

6. The shock-mount of claim 5, wherein one side of said yoke is substantially planar.

7. The shock mount of claim 1, wherein the wings are joined to said foot by webs.

8. The shock mount of claim 7, wherein the webs joining the wings to the foot lie substantially in the same plane.

9. In a shock-resistant mounting for shipping horizontally glass envelopes having a conoidal shape, the combination including,
   a glass envelope having a body of conoidal shape with an end face at its enlarged portion having a continuous peripheral edge, and a neck portion extending coaxially from its vertex,
   the axis of said envelope being disposed in a substantially horizontal position,
   and a pair of yokes of shock-resistant material contacting opposite diametrical portions of said glass envelope,
   each of said yokes having a pair of transversely spaced wings joined to a centrally offset foot,
   each of said spaced wings having a pocket in which a portion of the peripheral edge of the glass envelope is confined,
   each foot having an inclined envelope-contacting face bearing against a tapered conoidal portion of said envelope.

10. The shock-resistant mounting of claim 9, wherein the shock-resistant material is expanded plastic.

11. The shock-resistant mounting of claim 10, wherein the expanded plastic is polystrene.

12. The shock-resistant mounting of claim 10, wherein each pocket of the wings is bounded by two walls.

13. The shock-resistant mounting of claim 12, wherein at least one of said walls of each pockets has integral with it a ribbed structure whereby to provide stiffness to said wall.

14. The shock-resistant mounting of claim 13, wherein one side of each of said yokes is substantially planar.

15. The shock-resistant mounting of claim 9, wherein the wings of each yoke are joined to said foot by webs.

16. The shock-resistant mounting of claim 15, wherein the webs joining the wings to the foot lie in substantially the same plane.

17. The shock-resistant mounting of claim 9, wherein the glass envelope and the yokes are confined within a rectangular container such that one yoke is at the bottom of the container and the other at the top with the glass envelope supported horizontally between the yokes.

18. The shock-resistant mounting of claim 17, wherein a plurality of glass envelopes with associated yokes are confined in staggered relationship within said rectangular container.

References Cited
UNITED STATES PATENTS

| | | | |
|---|---|---|---|
| 2,863,595 | 12/1958 | Emery | 229—14 |
| 2,994,425 | 8/1961 | Honeycutt | 206—46 |
| 3,047,137 | 7/1962 | Kindseth | 229—14 |
| 3,049,260 | 8/1962 | Stone | 206—46 |
| 3,170,569 | 2/1965 | Knapp et al. | 206—46 |
| 3,294,226 | 12/1966 | McFarland et al. | 206—46 |

WILLIAM T. DIXSON, JR., *Primary Examiner.*